United States Patent [19]

Mousseaux et al.

[11] Patent Number: 5,337,392
[45] Date of Patent: Aug. 9, 1994

[54] METHOD OF COUPLING AN OPTICAL FIBER TO AN OPTICAL COMPONENT ON THE SAME SUBSTRATE

[75] Inventors: Daniel Mousseaux, Palaiseau; Gérard Gelly, La Norville; Emmanuel Grard, Saint Michel sur Orge, all of France

[73] Assignee: Alcatel Cit, Paris, France

[21] Appl. No.: 102,992

[22] Filed: Jul. 28, 1993

[30] Foreign Application Priority Data

Jul. 29, 1992 [FR] France ................ 92 09392

[51] Int. Cl.⁵ ................................. G02B 6/42
[52] U.S. Cl. .................... 385/90; 385/25; 385/67; 385/84
[58] Field of Search ............ 385/67, 25, 31, 52, 385/84, 85, 88, 91, 95–99, 123, 127, 90

[56] References Cited

U.S. PATENT DOCUMENTS

| | | | |
|---|---|---|---|
| 4,186,994 | 2/1980 | Denkin | 385/88 |
| 4,302,267 | 11/1981 | Palmer et al. | 156/158 |
| 4,613,214 | 9/1986 | Brugger et al. | 385/52 X |
| 4,702,547 | 10/1987 | Enochs | 385/90 |
| 4,738,508 | 4/1988 | Palmquist | 385/84 X |
| 4,770,529 | 9/1988 | Levinson et al. | 356/153 |
| 4,783,143 | 11/1988 | Eicher et al. | 385/53 |
| 4,787,698 | 11/1988 | Lyons et al. | 385/84 X |
| 4,825,092 | 4/1989 | Mehadji | 250/561 |
| 4,832,438 | 5/1989 | Engel et al. | 385/63 |
| 4,898,447 | 2/1990 | Kuhlmann | 385/25 |
| 5,045,678 | 9/1991 | Esser et al. | 250/201.1 |
| 5,131,745 | 7/1992 | Whitney et al. | 356/153 |
| 5,282,259 | 1/1994 | Grois et al. | 385/84 |

FOREIGN PATENT DOCUMENTS

| | | | |
|---|---|---|---|
| 2358785 | 6/1975 | Fed. Rep. of Germany | G02B 7/00 |
| 1536340 | 1/1990 | U.S.S.R. | 385/70 |

Primary Examiner—Frank Gonzalez
Attorney, Agent, or Firm—Sughrue, Mion, Zinn, Macpeak & Seas

[57] ABSTRACT

In a method of coupling an optical fiber to an optical component on the same substrate, eccentricity of the core of a coupling fiber is exploited to adjust the vertical position of the core by rotation of the fiber about its axis. This adjustment is carried out with the fiber held in contact with a horizontal reference surface of a substrate also carrying a laser diode constituting the component to which the fiber must be coupled. The method can be used to implement transmission headers for optical fiber telecommunication systems.

9 Claims, 1 Drawing Sheet

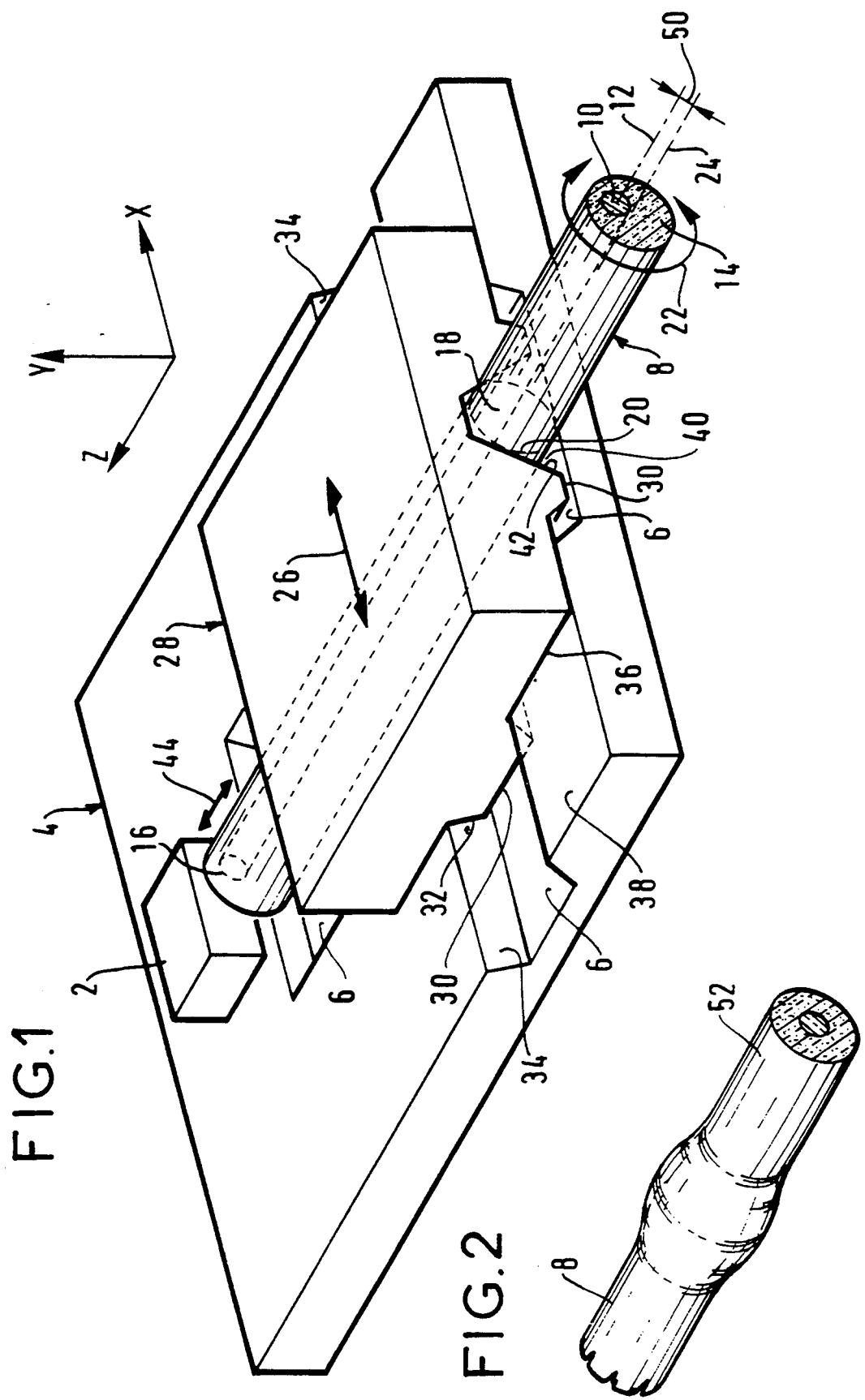

METHOD OF COUPLING AN OPTICAL FIBER TO AN OPTICAL COMPONENT ON THE SAME SUBSTRATE

BACKGROUND OF THE INVENTION

1. Field of the Invention

The present invention concerns coupling an optical fiber to an optical component such as a semiconductor laser diode or a photodiode on the same substrate to form an optical send or receive header.

2. Description of the Prior Art

A first problem to be overcome in making any such coupling is to achieve low coupling losses. This requires extremely accurate location.

In a known coupling method the component is fixed to the substrate first, typically by soldering it in place. In this way its active area is located at a predetermined height above a reference surface of the substrate. This height is as closely equal as possible to that assumed by the core of a coupling optical fiber at one end of this fiber when a cylindrical manipulation surface attached to the fiber is brought into bearing engagement with this reference surface.

This manipulation surface is provided by a cylindrical ferrule in the shape of a body of revolution. The fiber is disposed in the ferrule parallel to its axis but off-center. This enables adjustment of the vertical position, i.e. correction of any height difference between the active area of the component and the core of the fiber. This is simply achieved by rotating the ferrule about its axis in contact with the reference surface. Given the positional accuracy required for good coupling the ferrule must be accurately manufactured.

Transverse and longitudinal adjustments are effected by movement of the ferrule in contact with the reference surface before the coupling fiber is fixed once and for all to the substrate.

The coupling fiber is typically short to facilitate the various adjustments and other manipulations. After it is fixed to the substrate its other end is welded to a longer fiber to be coupled. Known welding processes are such that the resulting weld introduces only low light losses.

A second problem that usually has to be overcome in making any such coupling is to make the optical header which contains the component, a section of the coupling fiber and the components needed for coupling them as small as possible. To this end a small substrate is used.

One object of the present invention is to enable good coupling between an optical component and a coupling fiber within in a compact and low-cost optical header.

SUMMARY OF THE INVENTION

The present invention consists in a method of coupling an optical fiber to an optical component on the same substrate using the eccentricity of the core of an optical fiber constituting a coupling fiber relative to a cylindrical manipulation surface of said coupling fiber wherein adjustment of the vertical position of said core is effected by rotation of said coupling fiber about the axis of said manipulation surface in combination with maintained application of said manipulation surface to a horizontal reference surface of said substrate which also carries the component to which said coupling fiber must be coupled and said manipulation surface is the outside surface of the optical cladding of said coupling fiber.

How the present invention may be put into effect is now described with reference to the accompanying diagrammatic drawing and by way of non-limiting example only.

BRIEF DESCRIPTION OF THE DRAWINGS

FIG. 1 is a perspective view of a device for implementing the method in accordance with the invention.

FIG. 2 shows a coupling fiber welded to a longer fiber to be connected to the device.

DETAILED DESCRIPTION OF THE INVENTION

The method described herein by way of example comprises the following operations which, in so far as the functions described below are concerned, it shares with prior art methods.

Fixing a component 2 to a rigid substrate 4 which is disposed horizontally, for example. The substrate has a longitudinal direction Z and a transverse direction X, both horizontal, and a vertical direction Y. It has a horizontal upper reference surface 6 which is lower than the component, which is a laser diode, for example. Directions and orientations of surfaces are naturally defined relative to the substrate for the purposes of description.

Preliminary placing of an optical fiber 8 near its future coupling position, above the reference surface 6. In the typical case where the fiber to be coupled is a long fiber the word "fiber" as used hereinafter refers not to the fiber to be coupled as such but rather to an end segment of a relatively short coupling fiber (or pigtail fiber) to the other end of which the fiber to be coupled is connected at a later stage. At this stage the fiber is oriented with its length in said longitudinal direction. It has a core 10 having a longitudinal axis 12 and surrounded by optical cladding 14, optical coupling being achieved by positioning an end 16 of the core in a coupling position relative to the component 2. The fiber has a manipulation surface 18 which is used to move or hold it. This surface is cylindrical with longitudinal generatrices. To be more precise, it is the peripheral surface of the optical cladding 14 of the fiber.

Adjustment of the longitudinal, transversal and vertical positions of the fiber relative to the substrate 4 to achieve the required coupling. At least the transversal and vertical adjustments are carried out with pressure applied to the manipulation surface 18.

Finally, fixing of the fiber 8 to the substrate 4 to render the coupling permanent.

According to the present invention the manipulation surface 18 has a cross-section 20 which departs from a circle entered on the core axis 12 of the fiber 8. This cross-section is circular in this example but it could equally well be elliptical or ovoid. The core axis 12 is deliberately eccentric to a longitudinal fiber axis 24 which is that of the cylindrical manipulation surface 18 which is the shape of a body of revolution. The eccentricity is shown at 50.

The operation of preliminary placement of the fiber 8 then includes bearing engagement of this manipulation surface against the reference surface 6 and the operation of adjusting the vertical position of the fiber is obtained by rotation (see arrow 22) of the fiber around a longitudinal axis such as the axis 24. This rotation is effected with the manipulation surface pressed against the reference surface.

Like other adjustment displacements, this rotation is symbolically represented in the figure by a double-headed arrow.

In the preferred embodiment shown by way of example the fiber 8 has a circular cross-section and during at least said operations to adjust the vertical position 22 and transverse position 26 of the fiber a fiber guide 28 is placed over the fiber and the substrate 4.

A lower surface 30 of the fiber guide incorporates the following surfaces:

Mobile main guide surfaces 32 cooperating with fixed main guide surfaces 34 on the substrate 4. Some at least of the main guide surfaces have transverse generatrices, i.e. generatrices parallel to the transverse direction, and depart from horizontal surfaces to enable transverse displacement 26 of the fiber guide 28 but prevent longitudinal displacement and rotation about vertical axes. They are plane surfaces parallel to the transverse direction, for example. In this way a transverse guide rail is obtained.

Mobile bearing surfaces 36 resting on fixed bearing surfaces 38 on the substrate 34. At least some of these bearing surfaces also have transverse generatrices. They comprise plane surfaces parallel to this direction, for example. They depart from vertical surfaces to prevent any vertical displacement of the fiber guide and any rotation of the guide about horizontal axes during said transverse displacement. These bearing surfaces are horizontal in this example.

A fiber guide and bearing channel 40 recessed into the substrate and having walls 42 with longitudinal generatrices, i.e. generatrices parallel to the longitudinal direction; these walls are plane, for example, and bear on the manipulation surface 18. They depart from horizontal surfaces. They constitute fiber guide surfaces 42 in contact with the manipulation surface to prevent any transverse displacement of the fiber 8 relative to the fiber guide and any rotation about vertical axes.

Some of these walls depart from vertical surfaces to constitute fiber bearing surfaces in contact with the manipulation surface. They cooperate with the reference surface 6 to prevent any vertical displacement of the fiber and any rotation about transverse axes while the mobile bearing surfaces are in contact with the fixed bearing surfaces 38. In this example the fiber bearing surfaces are two oblique sides 42 of the channel 40 which also constitute fiber guide surfaces, as mentioned above.

The transverse position of the fiber is adjusted by transverse displacement 26 of the fiber guide 28.

Each of said operations to adjust the transverse and vertical positions of the fiber 8 typically comprises a succession of partial adjustments leading to respective final transverse and vertical adjustments.

In this case the adjustments are carried out in the following order using the fiber guide 28:
 adjustment of the longitudinal position in the direction of the double-headed arrow 44, and
 a succession of composite partial adjustments each comprising a vertical partial adjustment 22 followed by a transverse partial adjustment 26.

In this case said operation of fixing the fiber 8 to the substrate comprises, after the final vertical adjustment and before the final transverse adjustment, a partial fixing operation to fix the fiber to the fiber guide 28.

After the final transverse adjustment another partial fixing operation fixes the fiber guide to the substrate 4.

These various fixing operations are effected by gluing.

The fiber 8 previously mentioned constitutes a coupling fiber designed to achieve good coupling to the component 2 as a result of the operations described above. It is also chosen so that the required eccentricity 50 enables efficient optical connection of the coupling fiber to a long fiber to be coupled by welding the two fibers end-to-end. The method then further comprises, after fixing the coupling fiber 8 to the substrate, welding the fiber to be coupled 52 (see FIG. 2) to the coupling fiber. The fiber 52 to be coupled typically has a centered core which is therefore out of alignment with the core of the coupling fiber 8. The required eccentricity is 2 $\mu$m in the typical case of fibers with a diameter of 125 $\mu$m, for example, and this means that a weld made by a commercially available machine such as the VSM machine marketed by the French company Mars-Actel does not introduce light losses exceeding those introduced by a weld between two centered core fibers. Such losses are entirely acceptable ( . . . dB).

This eccentricity is also sufficient to correct any errors that may occur when fixing the component 2 in respect of the height of the active area of the component above the reference surface.

These errors are typically dependent only on errors in the thickness of the semiconductor layers deposited epitaxially during the fabrication of the component 2, errors in the thickness of the solder fixing the component to the substrate and errors in the depth of the Reactive Ion Etching which forms the reference surface.

Finally, it is simple and inexpensive to obtain an appropriate coupling fiber. The eccentricity specified above is typical for fibers manufactured by modern processes.

The substrate 4 and the fiber guide 28 are preferably made from monocrystalline silicon and at least some of the bearing and/or guide surfaces 32, 34, 36, 38, 42 and the reference surface 6 are major crystallographic planes of these elements.

There is claimed:
 1. Method of coupling an optical fiber to an optical component on the same substrate using the eccentricity of the core of an optical fiber constituting a coupling fiber relative to a cylindrical manipulation surface of said coupling fiber wherein adjustment of the vertical position of said core is effected by rotation of said coupling fiber about the axis of said manipulation surface in combination with maintained application of said manipulation surface to a horizontal reference surface of said substrate which also carries the component to which said coupling fiber must be coupled and said manipulation surface is the outside surface of the optical cladding of said coupling fiber.

2. Method according to claim 1 comprising the following operations:
 obtaining a rigid substrate having an upper horizontal reference surface,
 fixing said component to said substrate at a predetermined height above said reference surface,
 choosing an optical fiber having a silica optical cladding whose thickness is appropriate to said predetermined height of the component above the reference surface, a lateral surface of said cladding constituting a manipulation surface of said fiber and having an axis constituting an axis of said fiber which has a core having a required eccentricity relative to said axis, said fiber constituting said coupling fiber, applying said manipulation surface of said coupling fiber to said reference surface, positioning said coupling fiber on said reference surface to enable the least imperfect optical coupling of said fiber to said component, and vertical position adjustment by rotation of said fiber about its axis to improve said optical coupling.

3. Method according to claim 2 wherein a fiber to be coupled to said component is different than said coupling fiber which is chosen such that the required eccentricity enables efficient optical coupling of said coupling fiber to said fiber to be coupled by end-to-end welding of said two fibers, said method further comprising:

fixing said coupling fiber to said substrate, and
welding said fiber to be coupled to said coupling fiber.

4. Method according to claim 2 wherein said manipulation surface is a cylindrical body of revolution.

5. Method according to claim 4 wherein said rigid substrate has a longitudinal direction and a transverse direction which are both horizontal and a vertical direction, said positioning of said coupling fiber orienting a length of said fiber along said longitudinal direction, and comprising longitudinal and transverse position adjustments of said fiber, a fiber guide being placed over said optical fiber and said substrate during at least said operations to adjust the vertical position and transverse position of said fiber, a lower surface of said fiber guide having:

mobile main guide surfaces cooperating with fixed main guide surfaces on said substrate, some at least of said main guide surfaces having transverse generatrices and departing from horizontal surfaces to enable transverse displacement of said fiber guide but prevent any longitudinal displacement thereof and any rotation thereof about vertical axes, mobile bearing surfaces bearing on fixed bearing surfaces on said substrate, at least some of said bearing surfaces having transverse generatrices and departing from vertical surfaces to prevent any vertical displacement of said fiber guide and any rotation about horizontal axes during said transverse displacements thereof, a fiber guide and bearing channel recessed into said substrate and having walls with longitudinal generatrices bearing on said manipulation surface of said optical fiber, some of said walls departing from horizontal surfaces to constitute fiber guide surfaces preventing transverse displacement of said optical fiber relative to said fiber guide and any rotation of said optical fiber about vertical axes, some of said walls departing from vertical surfaces to constitute fiber bearing surfaces cooperating with said reference surface to prevent any vertical displacement of said fiber and any rotation of said fiber about transverse axes while said mobile bearing surfaces are in contact with said fixed bearing surfaces, said operation of adjusting the transverse position of the fiber being effected by a transverse displacement of said fiber guide.

6. Method according to claim 5 wherein said adjustment operations are effected in the following order with said fiber guide present:

longitudinal position adjustment, and
a succession of composite partial adjustments each comprising a vertical partial adjustment followed by a transverse partial adjustment.

7. Method according to claim 6 further comprising, after a final vertical adjustment and before a final transverse adjustment, a partial fixing operation to fix said optical fiber to said fiber guide and, after said final transverse adjustment, another partial fixing operation to fix said fiber guide to said substrate.

8. Method according to claim 7 wherein said fixing operations are effected by gluing.

9. Method according to claim 5 wherein said substrate and said fiber guide are made from monocrystalline silicon and at least some of said bearing and/or guide surfaces and reference surfaces are major crystallographic planes.

* * * * *